United States Patent [19]

Billet

[11] Patent Number: 4,723,054
[45] Date of Patent: Feb. 2, 1988

[54] SHEATH FOR PROTECTING ELECTRIC JUNCTION BETWEEN A MULTIPOLE CABLE AND A PLURALITY OF INDEPENDENT CONDUCTORS

[75] Inventor: Claude Billet, Fontenay, France

[73] Assignee: Treficable Pirelli, St. Maurice, France

[21] Appl. No.: 854,431

[22] Filed: Apr. 21, 1986

[51] Int. Cl.⁴ .................................... H02G 15/00
[52] U.S. Cl. .................. 174/74 R; 174/74 A; 174/77 R; 174/88 R; 174/93
[58] Field of Search ............. 174/74 R, 74 A, 75 R, 174/77 R, 88 R, 93

[56] References Cited

U.S. PATENT DOCUMENTS

| 2,946,839 | 7/1960 | Horning | 174/93 |
| 3,009,986 | 11/1961 | Stephens | 174/93 |
| 3,592,958 | 7/1971 | Munn | 174/88 R |
| 4,194,082 | 3/1980 | Campbell | 174/74 A |
| 4,207,429 | 6/1980 | Ward | 174/88 R |
| 4,311,871 | 1/1982 | Brunner et al. | 174/74 A |

FOREIGN PATENT DOCUMENTS

| 520130 | 6/1953 | Belgium | 174/88 R |
| 3226124 | 1/1984 | Fed. Rep. of Germany | 174/77 R |
| 997640 | 1/1952 | France | 174/74 A |
| 2537797 | 6/1984 | France | 174/88 R |

Primary Examiner—Morris H. Nimmo
Attorney, Agent, or Firm—Brooks Haidt Haffner & Delahunty

[57] ABSTRACT

The invention provides a sheath for protecting an electric junction between a multipole cable and a plurality of independent conductors.

According to the invention, this sheath (8) is resilient and comprises, at one end, a first opening (11) by which it is fitted at the end of the multipole cable (1). The sheath (8) comprises, at its second end, several internal casings intended to receive the connecting sleeves (4) between the conductors (2) and (3). This second end is closed by an abutment wall (15) having openings (21) for passing the independent conductors (3) therethrough.

7 Claims, 2 Drawing Figures

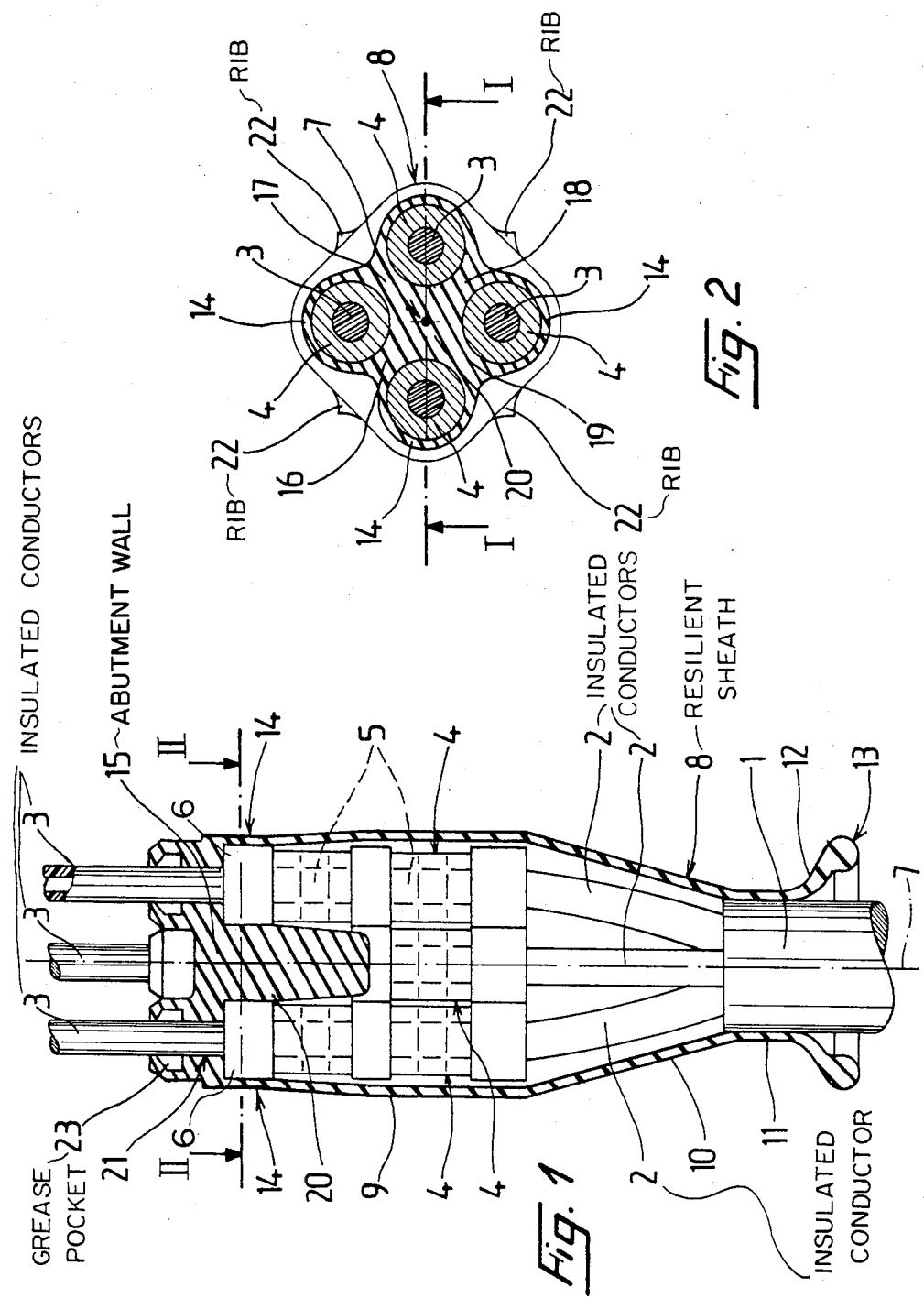

SHEATH FOR PROTECTING ELECTRIC JUNCTION BETWEEN A MULTIPOLE CABLE AND A PLURALITY OF INDEPENDENT CONDUCTORS

The invention relates to a sheath for protecting an electric junction between a multipole cable and a plurality of independent conductors. It relates more particularly to low voltage single phase or three phase junctions between an underground cable and an insulated overhead cable, for distributing household electric power.

In an electric distribution network it is sometimes necessary to connect an underground line to an overhead line: for example a multipole underground cable which comprises several juxtaposed conductors enclosed in a single sheath to an insulated overhead cable which is generally formed of a twisted bundle of insulated independent conductors. This connection is made along the post supporting the overhead cable: each conductor of the underground cable is connected to the corresponding conductor of the overhead cable by means of a connection sleeve crimped to the ends of the two conductors, the different sleeves being staggered with respect to each other along the post. The end of the sheath of the underground cable is protected by an appropriate heat shrinkable end piece and each connection sleeve is insulated and sealed independently by a heat shrinkable sheath.

This conventional technique has several drawbacks: on the one hand, the use of a hot air generator such as an air-propane burner is inconvenient to handle and sometimes even dangerous when working on a post and, on the other hand, this junction extends over a great length so as to avoid any risk of arcing between the sleeves.

Therefore, one of the aims of the invention is to provide a sheath for protecting an electric junction between a multipole cable and a plurality of independent conductors, providing better sealing, electric insulation and maintenance of the junction, so that this latter may be designed in a very compact form.

Another aim of the invention is to provide such a sheath which may be positioned on site without special tools and more particularly without a hot air generator.

The invention relates than to a sheath for protecting an electric junction between a multipole cable comprising a plurality of conductors enclosed in a common jacket, each being connected to an independent conductor by means of a connection sleeve, said sheath being intended to be fitted on said multipole cable so as to hold these sleeves in position and isolate them electrically from each other, and to provide sealing of the junction as a whole, characterized in that said sheath is resilient and has a first end, an opening through which the assembly of said juxtaposed connection sleeves may pass and which bears sealingly on said multipole cable, said sheath having a second end closed by an abutment wall which comprises as many openings as there are conductors to be connected, each of said openings being capable of bearing sealingly on one of said independent conductors, the side wall of the sheath defining, with one or more internal walls, a plurality of casings intended to surround said connection sleeves over at least a part of their length and each disposed in line with one of said openings of the abutment wall.

Advantageously, this sheath comprises gripping means which are preferably disposed in the vicinity of the first end of the sheath.

In a particular embodiment, these gripping means comprise a truncated cone opening outwardly of the sheath from the opening of its first end and ending in a peripheral rim.

Advantageously the sheath comprises, in line with each of the openings of the abutment wall, a grease reserve pocket which is formed in the thickness of the abutment wall.

Preferably, the side wall of the sheath comprises a plurality of longitudinal strengthening ribs spaced apart at its periphery.

In a preferred embodiment of the invention, this sheath, which is intended to receive between two and four connection sleeves, is of a generally tubular shape and comprises four peripherally spaced casings.

The following description which has no limitative character refers to the accompanying Figures in which:

FIG. 1 is an elevational view in section through line I—I of FIG. 2, of a sheath in accordance with the invention;

FIG. 2 is a section through line II—II of FIG. 1.

In FIG. 1 is shown a three phase underground cable 1 comprising four conductors 2, namely three phase conductors and a neutral; only three of them are visible in the Figure. These conductors 2 are individually insulated and enclosed in a common cylindrical jacket The underground cable 1 is connected to an insulated overhead cable comprising four independent isolated conductors 3 twisted together along the whole of the cable. The end section of the underground cable 1 and that of the overhead cable are fixed, for example, along a post supporting the overhead line, the underground cable being directed upwardly and the overhead cable being directed downwardly of this post. The ends of the two cables to be joined together are disposed in the extension of each other, in a substantially vertical direction.

The connection between the underground cable 1 and the overhead cable is provided in a way known per se by means of cylindrical connection sleeves 4: the ends 5 of two corresponding conductors, 2 and 3, to be joined together are bared and fitted into a connecting sleeve 4, which is then crimped on these conductors. These sleeves 4 are electrically insulated and sealed individually either by design, or on site, for example using resilient jackets.

The four connecting sleeves 4 are disposed parallel to the axis 7 of the underground cable 1, and opposite each other. More precisely, they are spaced evenly apart about the axis 7 (FIG. 2).

The junction thus defined is covered with a protective sheath 8 made from a resilient material, more particularly from a molded eastomer such as Neoprene (registered trademark) or E.P.D.P. (ethylene-propylene-diene-monomere). This sheath 8 is of a general tubular shape. Its middle portion 9 has a section whose dimensions are the largest and which, in the present case, is substantially square. This middle portion 9 is extended on one side by a conical portion 10 which tapers to a first end of the sheath, which is formed by a hollow cylindrical portion 11 defining an opening whose diameter is slightly less than the outer diameter of the jacket of the underground cable 1. Through its own resilience, the cylinder portion 11 thus fits sealingly over the jacket of the underground cable 1. The cylinder portion 11 is extended in its turn, by opening out outwardly of the sheath, through a truncated cone shape 12 whose free edge has a peripheral rim 13.

The middle portion 9 of sheath 8 tapers slightly towards the second end thereof. The side wall, or outer wall, is shaped at this end so as to define four cylindrical casing portions 14 whose concavity is turned towards the axis of sheath 8. The four cylindrical casing portions 14 extend parallel to the axis of sheath 8 and they are joined together by their longitudinal edges.

The second end of sheath 8 further comprises four internal walls 16 to 19 disposed in the form of a cross about the axis of the sheath and extending along this axis. These internal walls are joined together in the vicinity of the axis of the sheath, in a region 20 (cf. FIG. 1 and FIG. 2) and each of them is connected to the outer wall of sheath 8, at the junction line between two adjacent cylindrical casing portions 14. The internal walls 16 to 19 define, with portions 14, four complete cylindrical casings whose inner diameter is substantially equal to the diameter of the connecting sleeves 4.

The internal walls 16 to 19 may extend (FIG. 1) inwardly of sheath 8 over a length greater than that of the cylindrical casing portions 14 so as to contribute to holding the connecting sleeves 4 in position and isolating them from each other.

The second end of sheath 8 also comprises an abutment wall 15 perpendicular to the axis of the sheath. This abutment wall 15 is joined to the peripheral edge of the side wall sheath 8 as well as to the internal wall 16 to 19.

The abutment wall 15 comprises four openings 21 formed in line with the cylindrical casings of the end of sheath 8. The diameter of these openings 21 is slightly less than the diameter of the insulated conductors 3 of the overhead cable, thus allowing sealing fitting over this latter because of their resilience.

In line with each opening 21 of the abutment 15 and towards the end of sheath 8 is provided a grease reserve pocket 23. This pocket may be formed in the thickness of the abutment wall 15, in the form of a circular groove having a diameter greater than the diameter of opening 21.

In the case of single phase cables to be connected, only two openings out of four will be formed during molding of sheath 8, which advantageously allows the same mold to be used.

So as to give sheath 8 sufficient rigidity, four ribs 22 are formed on its outer surface; these ribs are disposed at the center of the four faces of the middle portion 9 of square section sleeve 8 and extend over a considerable part of the length of the sleeve.

When such a sheath is used for protecting an electric junction, it is fitted over the overhead cable before the junction is formed, each of the overhead conductors 3 being introduced, from the abutment wall 15, into one of the openings 21 thereof, so as to pass completely through sleeve 8. The previous introduction of grease into pockets 23 promotes sliding of the conductors in the sheath. Once the junction between corresponding conductors 2, 3 has been formed using connecting sleeves 4, the sheath 8 is brought over the junction. Because of the resilience of sheath 8 and the truncated cone shape 12 the assembly of the four connecting sleeves 4 coated with a lubricant if necessary may be caused to pass through the cylinder portion 11 by pulling sheath 8 by means of its rim 13.

In this movement of sheath 8, the upper end 6 of the connecting sleeves 4 position themselves, because of the resilience of the sheath, in the cylindrical casings. Similarly the cylinder portion 11 is applied over the jacket of the underground cable 1. The downward movement of sheath 8 is limited by the abutment of sleeves 4 against the abutment wall 15. Sheath 8 then occupies its final position and provides complementary electric insulation between the sleeves as well as sealing of the electric junction as a whole: the walls of sheath 8 are in fact sealingly applied, on the one hand, over conductors 8 of the overhead cable and possibly over the connecting sleeves 4 and, on the other hand, over the jacket of the underground cable 1.

When such a junction is formed at the bottom of a post, it may be advantageous to cover it with a mechanical protective casing.

It will be noted that the abutment wall of the sheath allows precise and simple positioning thereof along the axis of the cable, when it is brought over the electric junction.

Furthermore, the gripping means, which form an integral part of the sheath, allow this latter to be brought over the junction by an energetic pull causing the sheath to be deformed radially when it slides over the junction, in particular over the connecting sleeves. It is therefore not necessary to use complementary tools for handling the sheath and particularly for expanding it radially so as to bring it over the junction.

I claim:

1. A one-piece tubular sheath of stretchable and resilient insulating material for enclosing in a sealed manner the electrical interconnections between the conductors of a multiconductor cable having a plurality of conductors enclosed in a common jacket and a plurality of insulated independent conductors, said connections comprising a plurality of conductive sleeves corresponding in number to the number of interconnected conductors, each sleeve interconnecting one of said conductors of said multiconductor cable with one of said independent conductors and said sleeves extending generally parallel to each other, said tubular sheath comprising:

a hollow central portion for surrounding a plurality of side-by-side, conductive interconnecting sleeves for interconnecting the conductors of a cable with a jacket around the latter conductors with a plurality of independent conductors and which has an open end at one end of said central portion for receiving said jacket with the wall of said open end in sealing engagement with said jacket, said open end being resiliently extendable to permit the passage of said sleeves; and an abutment wall at the opposite end of said central portion and extending transversely to the axis of said tubular sheath, said abutment wall having a plurality of openings therethrough equal in number to the number of said independent conductors for the passage of said independent conductors therethrough with the walls of said openings in sealing engagement with said independent conductors and said abutment wall with a portion of said central portion adjacent to said abutment wall defining a plurality of separately spaced peripherally closed cavities aligned with said openings and extending from a portion of said abutment wall toward said open end for receiving at least the end portions of said sleeves with the walls of each of said cavities respectively around an end portion of one of said sleeves and the ends of said cavities nearest said open end being spaced from said open end in the direction of said opposite end.

2. Sheath according to claim 1 further comprising hand engageable gripping means at said one end thereof for gripping said sheath at said lower end thereof and pulling it over said sleeves.

3. Sheath according to claim 1 further comprising stiffening ribs on the external surface of said central portion, said ribs being spaced apart circumferentially of said central portion and extending in the direction from said one end of said central portion toward said opposite end thereof.

4. Sheath according to claim 1 wherein said abutment wall has four said openings therethrough and there are four of said cavities.

5. A tubular sheath of strechable and resilient insulating material for enclosing in a sealed manner the electrical interconnections between the conductors of a multi-conductor cable having a plurality of conductors enclosed in a common jacket and a plurality of insulated independent conductors, said connections comprising a plurality of conductive sleeves corresponding in number to the number of interconnected conductors, each sleeve interconnecting one of said conductors of said multiconductor cable with one of said independent conductors and said sleeves extending generally parallel to each other, said sheath comprising:
  a hollow central portion for surrounding a plurality of side-by-side, conductive interconnecting sleeves for interconnecting the conductors of a cable with a jacket around the latter conductors with a plurality of independent conductors and which has an open end at one end of said central portion for the passage of said sleeves and for receiving said jacket with the wall of said open end in sealing engagement with said jacket, said central portion flaring outwardly at said one end thereof to provide a portion thereof at said one end thereof of truncated cone shape terminating at its free end in a peripheral rim for gripping said sheath and pulling it over said sleeves;
  an abutment wall at the opposite end of said central portion, said abutment wall having a plurality of openings therethrough equal in number to the number of said independent conductors for the passage of said independent conductors therethrough with the walls of said openings in sealing engagement with said independent conductors and said abutment wall with said central portion defining a plurality of separately, spaced cavities aligned with said openings and between a portion of said abutment wall and said open end for receiving at least one end portions of said sleeves with the walls of said cavities therearound.

6. A tubular sheath of stretchable and resilient insulting material for enclosing in a sealed manner the electrical interconnections between the conductors of a multiconductor cable having a plurality of conductors enclosed in a common jacket and a plurality of insulated independent conductors, said connections comprising a plurality of conductive sleeves corresponding in number to the number of interconnected conductors, each sleeve interconnecting one of said conductors of said multiconductor cable with one of said independent conductors and said sleeves extending generally parallel to each other, said sheath comprising:
  a hollow central portion for surrounding a plurality of side-by-side, conductive interconnecting sleeves for interconnecting the conductors of a cable with a jacket around the latter conductors with a plurality of independent conductors and which has an open end at one end of said central portion for the passage of said sleeves and for receiving said jacket with the wall of said open end in sealing engagement with said jacket; and
  an abutment wall at the opposite end of said central portion, said abutment wall having a plurality of openings therethrough equal in number to the number of said independent conductors for the passage of said independent conductors therethrough with the walls of said openings in sealing engagement with said independent conductors and having a plurality of grease reserve pockets aligned with said openings and formed within said abutment wall and said abutment wall with said central portion defining a plurality of separately, spaced cavities aligned with said openings and between a portion of said abutment wall and said open end for receiving at least the end portions of said sleeves with the walls of said cavities therearound.

7. A sheath according to claim 1 wherein the inner diameter of said portion of said central portion which defines said cavities is larger than the inner diameter of said open end.

* * * * *

UNITED STATES PATENT AND TRADEMARK OFFICE
CERTIFICATE OF CORRECTION

PATENT NO. : 4,723,054
DATED : February 2, 1988
INVENTOR(S) : Claude Billet

It is certified that error appears in the above-identified patent and that said Letters Patent is hereby corrected as shown below:

On the title page Insert

--(30) Foreign Application Priority Data
April 18, 1985 (FR) France  85 05857 --.

Column 2, line 56, "eastomer" should read -- elastomer --.
Column 4, line 11, " 8" should read -- 3 --.

Signed and Sealed this

Tenth Day of May, 1988

Attest:

DONALD J. QUIGG

Attesting Officer

Commissioner of Patents and Trademarks